(12) United States Patent
Choi et al.

(10) Patent No.: US 9,808,115 B2
(45) Date of Patent: Nov. 7, 2017

(54) FULL-AUTOMATIC TEA-MAKING MACHINE

(71) Applicant: MAIN POWER INDUSTRIAL (SHEN ZHEN) CO., LTD., Shenzhen, Guangdong Province (CN)

(72) Inventors: Meichee Choi, Shenzhen (CN); Li Dong, Shenzhen (CN); Jianbo Liu, Shenzhen (CN); Xuefeng Shang, Shenzhen (CN)

(73) Assignee: MAIN POWER INNOTECH (SHENZHEN) MANUFACTURING CO., LTD., Shenzhen, Guangdong Province (CN)

( * ) Notice: Subject to any disclaimer, the term of this patent is extended or adjusted under 35 U.S.C. 154(b) by 211 days.

(21) Appl. No.: 14/653,837

(22) PCT Filed: Sep. 3, 2013

(86) PCT No.: PCT/CN2013/082852
§ 371 (c)(1),
(2) Date: Jun. 18, 2015

(87) PCT Pub. No.: WO2014/094457
PCT Pub. Date: Jun. 26, 2014

(65) Prior Publication Data
US 2015/0327716 A1    Nov. 19, 2015

(30) Foreign Application Priority Data

Dec. 18, 2012  (CN) .......................... 2012 1 0551617
Aug. 2, 2013   (CN) .......................... 2013 1 0334511

(51) Int. Cl.
*A47J 31/40*  (2006.01)
*A47J 31/46*  (2006.01)
*A47J 31/20*  (2006.01)

(52) U.S. Cl.
CPC ............... *A47J 31/46* (2013.01); *A47J 31/20* (2013.01)

(58) Field of Classification Search
CPC .......... A47J 31/46; A47J 31/40; A47J 31/462; A47J 31/60
(Continued)

(56) References Cited

U.S. PATENT DOCUMENTS 7,717,026 B1 *  5/2010  Lassota ................... A47J 31/36
                                                           99/283
2009/0293733 A1 * 12/2009  Martin .................... A47J 31/60
                                                           99/280

(Continued)

FOREIGN PATENT DOCUMENTS

CH      700288 A2    7/2010
CN      2225202 Y    4/1996
(Continued)

OTHER PUBLICATIONS

English translation of CN 2225202Y, Zhimin Cai, published Apr. 1996.*
(Continued)

*Primary Examiner* — Michael Laflame, Jr.
(74) *Attorney, Agent, or Firm* — Cheng-Ju Chiang

(57) ABSTRACT

An automatic tea-making machine, comprising a base assembly and a tea-making assembly arranged on the base assembly. A water pump configured to pump water to the tea-making assembly and a motor are arranged on the base assembly. The tea-making assembly includes a tea-making cavity with an open top part, a closed bottom part and a closed peripheral wall; a tea basket driven by the motor, and a drain valve arranged at a bottom of the tea-making cavity and communicated with the tea-making cavity. The automatic tea-making machine of the present application can (Continued)

automatically wash tea and make tea, which is very convenient to use.

7 Claims, 6 Drawing Sheets

(58) Field of Classification Search
USPC .................................................. 99/279–323
See application file for complete search history.

(56) References Cited

U.S. PATENT DOCUMENTS

| | | | |
|---|---|---|---|
| 2010/0170971 A1* | 7/2010 | Doglioni Majer | A47J 42/38 241/30 |
| 2010/0173048 A1* | 7/2010 | Miller | A61L 2/183 426/231 |
| 2010/0203209 A1* | 8/2010 | Fishbein | A47J 31/18 426/433 |
| 2011/0086148 A1* | 4/2011 | Ford | A47J 31/18 426/431 |
| 2011/0232499 A1* | 9/2011 | Sinzig | A47J 31/3609 99/279 |

FOREIGN PATENT DOCUMENTS

| | | |
|---|---|---|
| CN | 1593310 A | 3/2005 |
| CN | 201005519 Y | 1/2008 |
| CN | 101301166 A | 11/2008 |
| CN | 201227172 Y | 4/2009 |
| CN | 201422582 Y | 3/2010 |
| EP | 0280794 A1 | 9/1988 |
| JP | 2005-287642 A | 10/2005 |

OTHER PUBLICATIONS

English translation of CN 201227172Y, Zhonghu Tang, published Apr. 2009.*

* cited by examiner

FULL-AUTOMATIC TEA-MAKING MACHINE

CROSS REFERENCE TO RELATED APPLICATIONS

The present application is a 35 U.S.C. §371 National Phase conversion of International (PCT) Patent Application No. PCT/CN2013/082852, filed on Sep. 3, 2013, the disclosure of which is incorporated by reference herein. The PCT International Patent Application was filed and published in Chinese.

BACKGROUND OF THE INVENTION

1. Field of the Invention

The present application relates to a tea-making machine, and more particularly, relates to a full-automatic tea-making machine.

2. The Related Arts

Drinking tea is a living habit of the Chinese. Currently, in the market, automatic tea-making machines have been manufactured to make it convenient for tea-making. A heating assembly is usually arranged in these automatic tea-making machines to boil or heat water. When making tea, hot water is poured into a container with a tea basket, or the tea basket is soaked in the hot water through up-and-down movements thereof. After being soaked for a while, the water and tea leaves are automatically separated from each other.

The automatic tea-making machines in the prior art have the following defects: when making tea, by pouring the hot water into a container with a tea basket, or making the tea basket soaked in the hot water through up-and-down movements thereof, the tea leaves can not move quickly in the hot water and can not be fully infused.

In addition, dust, impurity, pesticide, noxious bacteria or the like are often covered on tea leaves, thus when making tea, the tea leaves need to be washed by hot water firstly. In the prior art, no automatic tea-making machine can automatically wash the tea leaves.

SUMMARY OF THE INVENTION

The present application is to provide a full-automatic tea-making machine configured to automatically wash tea leaves, aiming at the defect of the automatic tea-making machine in the prior art that can not automatically wash tea leaves.

The technical solutions of the present application for solving the technical problems are as follows: an automatic tea-making machine is provided, which comprising a base assembly and a tea-making assembly arranged on the base assembly;
  wherein a water pump configured to pump water into the tea-making assembly and a motor are arranged on the base assembly; and
  the tea-making assembly includes:
  a tea-making cavity with an open top part, a closed bottom part and a closed peripheral wall;
  a tea basket driven by the motor; and
  a drain valve arranged at the bottom of the tea-making cavity and communicated with the tea-making cavity.

Preferably, the full-automatic tea-making machine further includes a waste water tank assembly arranged below the drain valve.

Preferably, the tea basket includes two positions: a first position in which the tea basket rotates in a first direction to press onto the drain valve and further close the drain valve, and a second position in which the tea basket rotates in a second direction to separate from the drain valve.

Preferably, the full-automatic tea-making machine further comprises a first clutch and a second clutch cooperated with each other to transmit a power between the motor and the tea basket, wherein the first clutch is driven by the motor, and the second clutch is configured to transmit the power to the tea basket.

Preferably, a helicoidal surface is defined on the first clutch; when the motor rotates in a first direction, the first clutch is cooperated with the second clutch at a lowest point of the helicoidal surface; and when the motor rotates in a second direction, the first clutch is cooperated with the second clutch at a highest point of the helicoidal surface.

Preferably, a helicoidal surface is defined on the second clutch; when the motor rotates in a first direction, the first clutch is cooperated with the second clutch at a highest point of the helicoidal surface; and when the motor rotates in a second direction, the first clutch is cooperated with the second clutch at a lowest point of the helicoidal surface.

Preferably, the tea-making assembly further includes a siphon arranged on the base assembly; the siphon includes a siphon inlet pipe communicating with an internal part of the tea-making cavity, and a siphon outlet pipe; and an upper end of the siphon inlet pipe is connected to an upper end of the siphon outlet pipe.

Preferably, a recessed receiving part of the tea-making assembly is defined on a top of the base assembly, and the tea-making assembly is received in the receiving part of the tea-making assembly.

Preferably, a transmission shaft receiving cylinder is fixed in the receiving part of the tea-making assembly, a transmission shaft is arranged in the transmission shaft receiving cylinder, and an upper end of the transmission shaft extends through the transmission shaft receiving cylinder, and is further connected to the tea basket.

Preferably, the full-automatic tea-making machine further includes a water purification chamber and a heating unit arranged on the base assembly; the water pump is connected to the water purification chamber through an inlet pipe and is connected to the heating unit through a first delivery pipe; and the heating unit is connected to the tea-making assembly through a second delivery pipe.

When implementing the full-automatic tea-making machine of the present application, the following advantageous effects can be achieved: it can automatically wash tea leaves and make tea and thus it is convenient to use.

BRIEF DESCRIPTION OF THE DRAWINGS

The present application will be further described with reference to the accompanying drawings and embodiments in the following, in the accompanying drawings.

DETAILED DESCRIPTION OF THE PREFERRED EMBODIMENTS

To make the objective, the technical solution and the advantages of the present application to be understood more clearly, now the present application is described in detail. It should be understood that, the specific embodiment described here is only for explanation, not for limitation.

Figure 1:
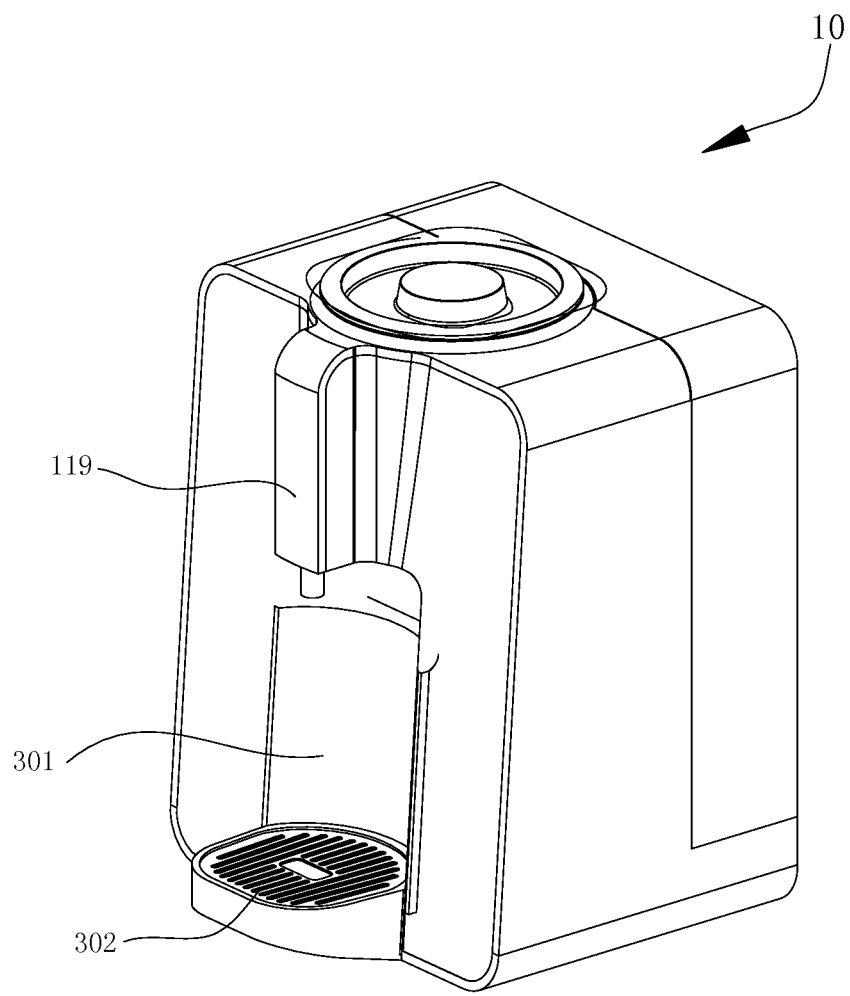
FIG. 1 is a stereogram of a full-automatic tea-making machine according to the present application.
Figure 2:
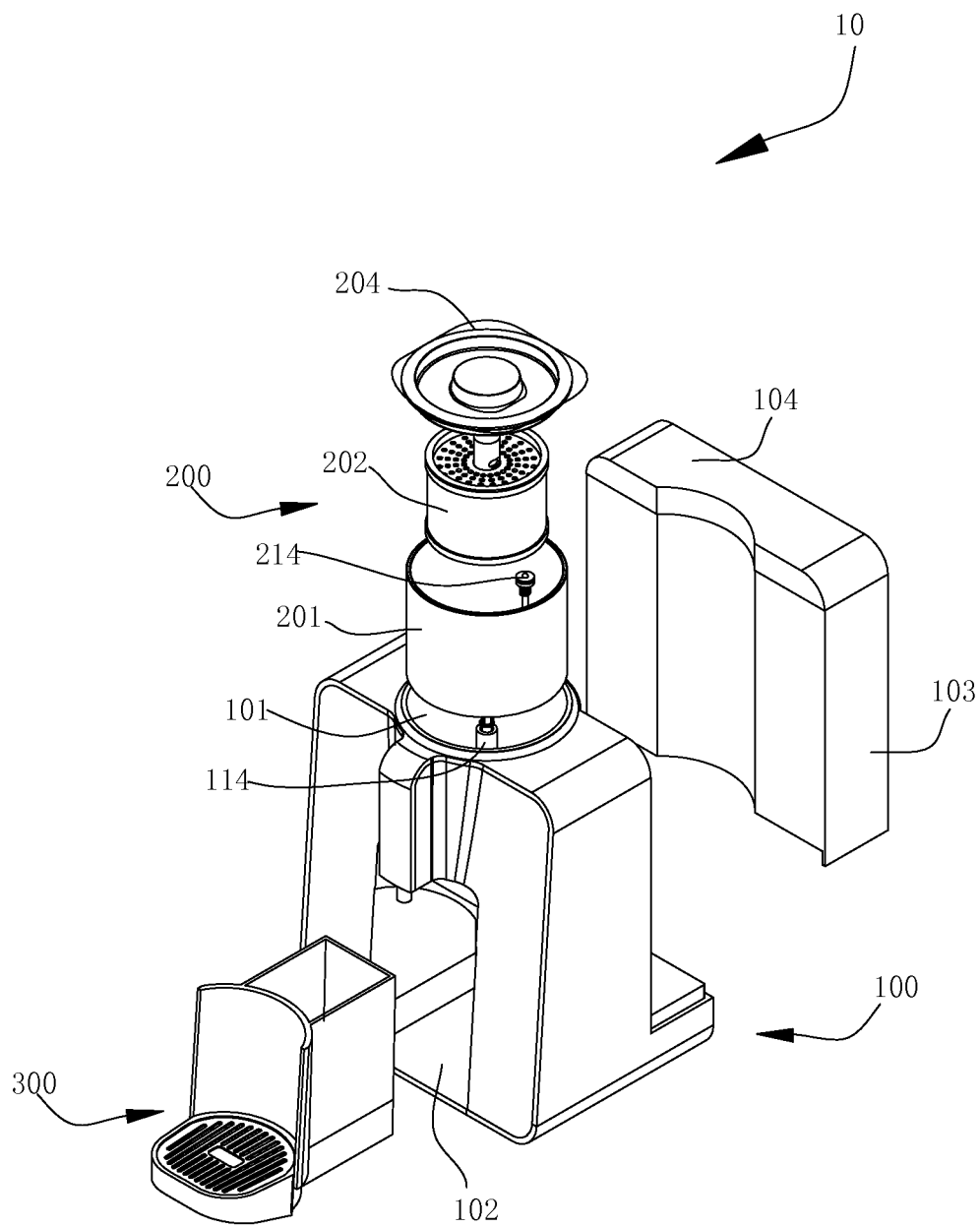
FIG. 2 is an exploded schematic view of the full-automatic tea-making machine according to the present application.

FIG. 1 is a stereogram of a full-automatic tea-making machine 10 according to the present application. FIG. 2 is an exploded schematic view of the full-automatic tea-making machine according to the present application. As shown in FIG. 1 and FIG. 2, the full-automatic tea-making machine 10 comprises a base assembly 100, a tea-making assembly 200, and a waste water tank assembly 300 arranged on the base assembly 100.

Figure 3:
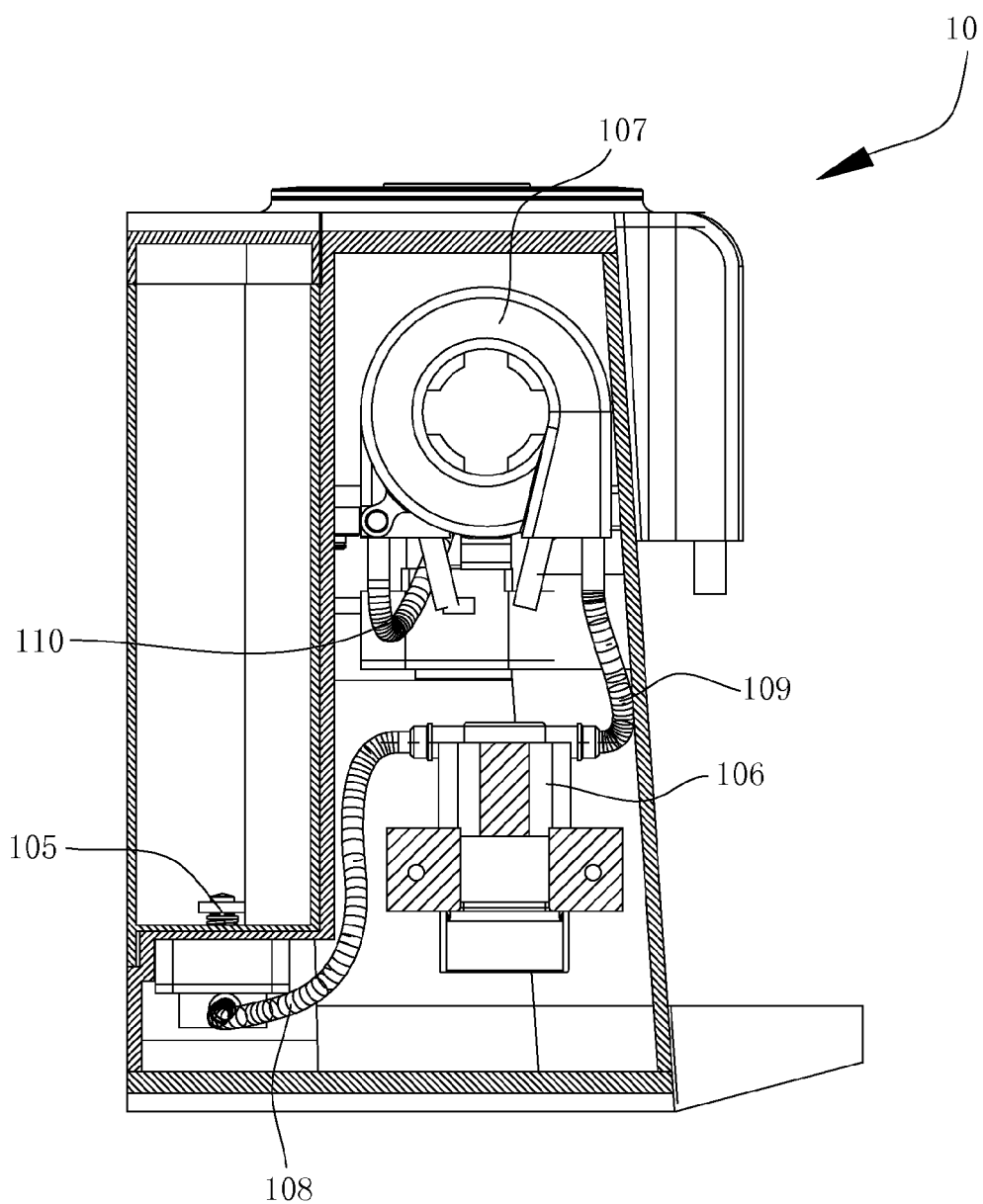
FIG. 3 is a cutaway view of the full-automatic tea-making machine according to the present application.

FIG. 3 is a cutaway view of the full-automatic tea-making machine 10 according to the present application. Combing with FIG. 1 to FIG. 3, in the shown embodiments, a recessed receiving part 101 for the tea-making assembly is defined on a top of the base assembly 100. An opening is further defined on a top of the receiving part 101 for the tea-making assembly, and thus a cylindrical receiving chamber is formed to receive the tea-making assembly 200. A receiving recess 102 for the waste water tank assembly is defined on one side of the base assembly 100, and the shape and the size of the receiving recess are corresponding to those of the waste water tank assembly 300, and thus it is possible for the waste water tank assembly 300 to be arranged into the receiving recess.

A water purification chamber 103 configured to hold clean water is defined on the other side of the base assembly 100. In this case, an opening is defined on a top of the water purification chamber 103, and a cover 104 of the water purification chamber is further defined in the water purification chamber 103. Users can open the cover 104 of the water purification chamber and add water into the water purification chamber 103. An inlet valve 105 is arranged at the bottom of the water purification chamber 103.

A water pump 106 and a heating unit 107 are further arranged in the base assembly 100. The water pump 106 is connected to the inlet valve 105 through an inlet pipe 108 to pump water from the water purification chamber 103. Meanwhile, the water pump 106 is connected to the heating unit 107 through a first delivery pipe 109, and the heating unit 107 is connected to the tea-making assembly 200 through a second delivery pipe 110. In an embodiment of the present application, winding pipelines are arranged in the heating unit 107 to heat the water that flows therethrough. In another embodiment of the present application, the first delivery pipe 109 is connected to the second delivery pipe 110 after winding through the heating unit 107. When the water pump 106 is working, water is pumped from the water purification chamber 103, and is introduced into the tea-making assembly 200 after being heated by the heating unit 107.

Figure 4:
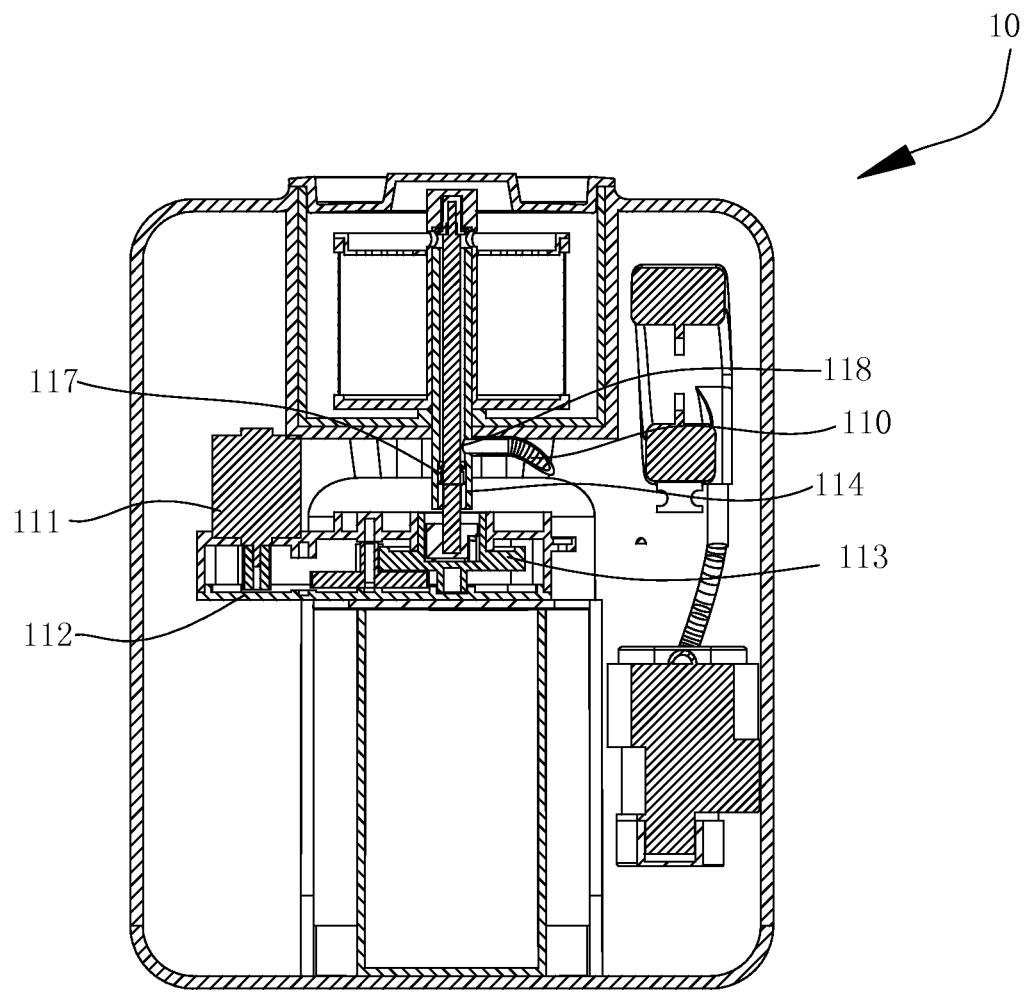
FIG. 4 is a cutaway view of the full-automatic tea-making machine in another direction according to the present application.
Figure 5:
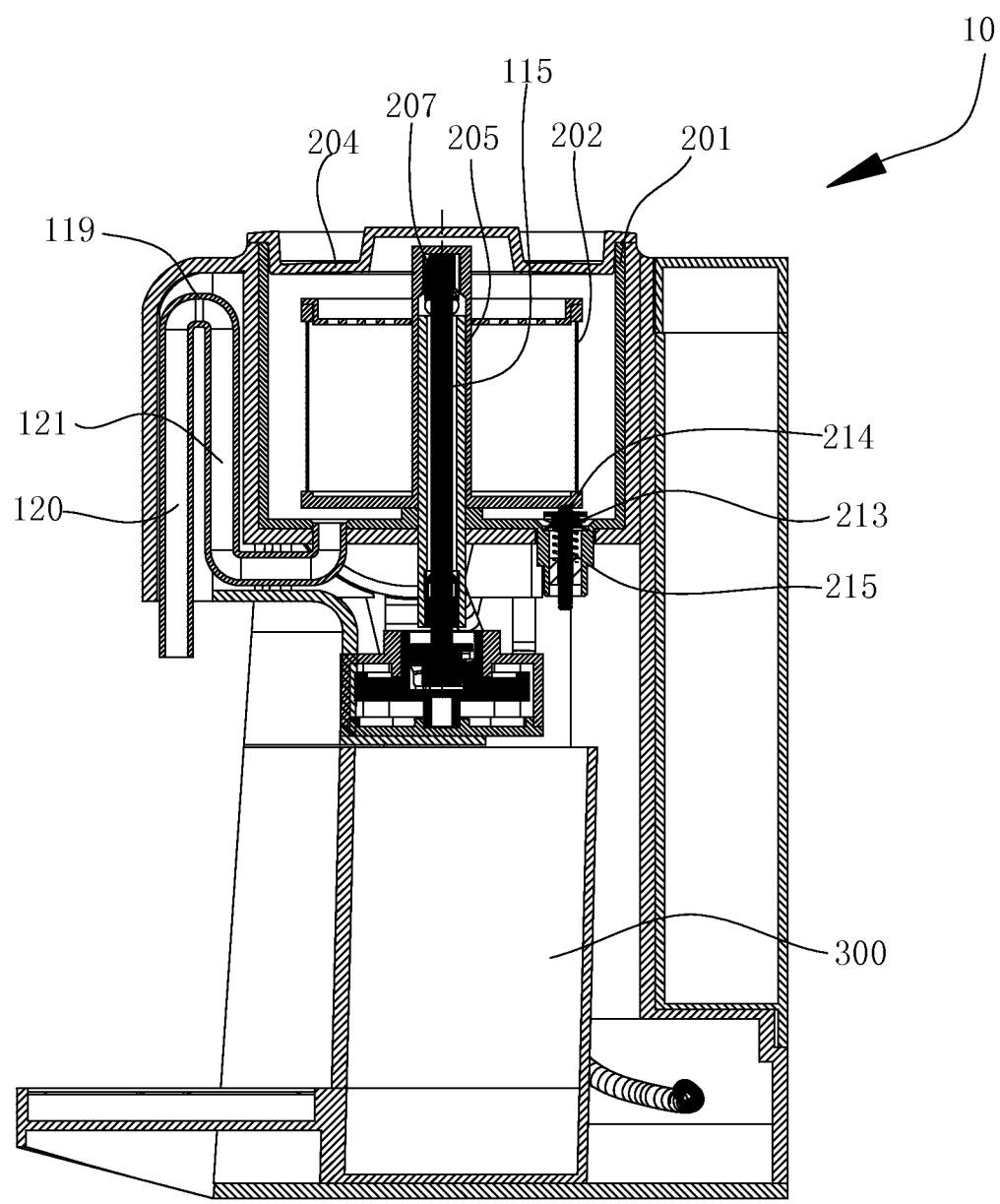
FIG. 5 is a cutaway view of a full-automatic tea-making machine in a further direction, according to the present application.

FIG. 4 is a cutaway view of the full-automatic tea-making machine 10 in another direction according to the present application. FIG. 5 is a cutaway view of the full-automatic tea-making machine 10 in a further direction according to the present application. As shown in FIGS. 2, 4 and 5, a motor 111 and a reduction gearbox 112 are further arranged in the base assembly 100. A first clutch 113 is arranged in the reduction gearbox 112 and is driven to rotate by the motor 111. A transmission shaft receiving cylinder 114 is fixed in the receiving part 101 for the tea-making assembly of the base assembly 100. A transmission shaft 115 is arranged in the transmission shaft receiving cylinder 114. A lower end of the transmission shaft 115 is connected to the first clutch 113 through a second clutch 116, and an upper end of the transmission shaft 115 extends through the transmission shaft receiving cylinder 114. The second clutch 116 is configured to transmit power to the tea basket 202.

An opening is defined on the top of the transmission shaft receiving cylinder 114. An inlet hole 118 is defined on the bottom of the transmission shaft receiving cylinder 114 and the inlet hole 118 is connected to the second delivery pipe 110. A sealing ring 117 is arranged between the transmission shaft 115 and a lower end of the transmission shaft receiving cylinder 114. The sealing ring 117 is arranged below the inlet hole 118. However, the present application is not limited here, and it is also possible for the second delivery pipe 110 to delivery water to the tea-making assembly 200 with other structures.

The tea-making assembly 200 comprises a tea-making cavity 201, a tea basket 202, and a tea-making cavity cover 204. The tea-making cavity 201 is in a cylindric shape with an open top part, a closed bottom part and a closed peripheral wall. A hole for the transmission shaft receiving cylinder 114 to pass through is defined at the centre of the bottom of the tea-making cavity 201. The tea basket 202 is arranged inside the tea-making cavity 201 and is sheathed outside the transmission shaft receiving cylinder 114. The tea basket 202 has a top part, a bottom part and a side wall, wherein a plurality of small holes are defined on the top part 208. The side wall of the tea basket 202 is made of porous materials such as gauze, in such a way that it is convenient for the water to enter into the tea basket 202, and for making tea. Specifically, the bottom part of the tea basket 202 is closed, and a fixed cylinder 205 is fixed in the center of the bottom part and extends upward vertically. In this case, the fixed cylinder 205 is sheathed outside the transmission shaft receiving cylinder 114, and a top of the fixed cylinder 205 is closed. An inlet hole 206 communicated with the tea basket 202 is defined on an upper end of the fixed cylinder 205, wherein the inlet hole 206 is located above the upper end of the transmission shaft receiving cylinder 114. A sealing element is arranged between the fixed cylinder 205 and the transmission shaft receiving cylinder 114.

An upper connector 207 is arranged inside the fixed cylinder 205, and the tea basket 202 is fixed to the transmission shaft 115 through the upper connector 207.

A drain valve 213 is further arranged in the tea-making cavity 201. In this case, the drain valve 213 is located at the bottom of the tea-making cavity 201 and is communicated with the inner part of the tea-making cavity 201. In the shown embodiment, the waste water tank assembly 300 can be directly placed under the drain valve 213 to get water. In other embodiments of the present application, the waste water tank assembly 300 is arranged below the drain valve 213 and is connected to the drain valve 213 through a drain pipe.

A drain plug 214 is arranged in the drain valve 213 and an upper end of the drain plug 214 extends to the inner part of the tea-making cavity 201. An elastic element 215 configured to open the drain plug 214 is arranged in the drain valve 213. An elastic force is constantly applied to the drain plug 214 by the elastic element 215 in such a way that the drain plug 214 is in an opening position.

A siphon 119 is arranged on the base assembly 100. In this case, the siphon 119 comprises a siphon outlet pipe 120 and a siphon inlet pipe 121. A lower end of the siphon inlet pipe 121 is communicated with the inner part of the tea-making cavity 201, and an upper end of the siphon inlet pipe 121 is communicated with an upper end of the siphon outlet pipe 120. A lower end of the siphon outlet pipe 120 extends until it protrudes out of the bottom of the tea-making cavity 201. A corresponding recessed part 301 and a placing board 302 extending and protruding out of the recessed part 301 are arranged on the waste water tank assembly 300. The recessed part 301 is located under the siphon 119, and containers such as cups can be placed on the placing board 302 to get water. When there is too much water in the tea-making cavity 201, the water will enter the siphon 119 through the siphon inlet pipe 121. After the water exceeds the top of the siphon inlet pipe 121, it will further enter the siphon outlet pipe 120 and flow into the containers such as cups, through the siphon outlet pipe 120.

Figure 6:
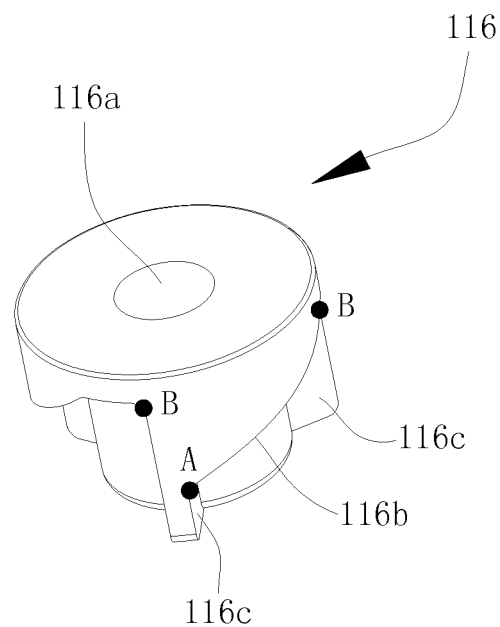
FIG. 6 is a structural schematic view of a second clutch.
Figure 7:
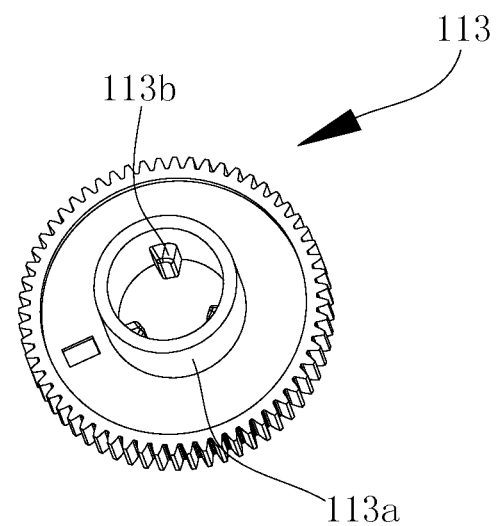
FIG. 7 is a structural schematic view of a first clutch.

FIG. 6 is a structural schematic view of the second clutch 116. FIG. 7 is a structural schematic view of the first clutch 113. As shown in FIG. 6, a center hole 116a configured to cooperate with the lower end of the transmission shaft 115 by interference fit is defined in the second clutch 116. A plurality of helicoidal surfaces 116b and two stop surfaces 116c respectively located at two ends of the helicoidal surface 116b are defined on an outer peripheral surface of the second clutch 116. A lowest point A and a highest point B adjacent to the stop surface 116c are defined on each helicoidal surface 116b. Now referring to FIG. 7, a connecting ring 113a configured for the second clutch 116 to insert into is defined on the first clutch 113, and a plurality of columns 113b are defined on an inner surface of the connecting ring 113a. When the second clutch 116 is inserted into the connecting ring 113a on the first clutch 113, the columns 113b will be respectively abutted against the corresponding helicoidal surfaces 116b.

A controller is further arranged on the base assembly 100, and is configured to control the on-and-off state of the heating unit 107, and further control a running time of the motor 111 during which the motor 111 runs in a first direction or a second direction.

The working principle of the full-automatic tea-making machine 10 will be described as follows: when making tea, water is added into the water purification chamber 103, and the tea-making cavity cover 204 is opened to add tea leaves into the tea basket 202. After that, the full-automatic tea-making machine 10 is started, the inlet valve 105 at the bottom of the water purification chamber 103 is opened; and the water pump 106 and the heating unit 107 begin to work. The water later passes through the inlet pipe 108 and the first delivery pipe 109, and then arrives at the heating unit 107 and is heated to a preset temperature. Then the water passes through the second delivery pipe 110 and enters the tea-making assembly 200.

Meanwhile, the motor 111 is energized and rotates in the first direction. A torque is transmitted to the first clutch 113 through the reduction gearbox 112. Top ends of the plurality of columns 113b of the first clutch 113 are abutted against the highest point B of the corresponding helicoidal surfaces 116b of the second clutch 116. The sidewalls of the columns 113b of the first clutch 113 are abutted against the stop surfaces 116c to drive the transmission shaft 115 to rotate. The tea basket 202 is driven to rotate by the transmission shaft 115 through the upper end connector 207, and the tea leaves therein are stirred and fully washed, in this way, the tea washing is achieved. When the motor 111 rotates in the first direction, the tea basket 202 is put in a first position and is pressed on the drain plug 214, and the drain valve 213 is closed under the gravity of the tea basket 202.

When the motor 111 has rotated in the first direction for a preset period, the tea leaves in the tea basket 210 has been washed thoroughly. The motor 111 rotates in the second direction opposite to the first direction under the control of the controller, and the top ends of the plurality of columns 113b of the first clutch 113 are abutted against the lowest point A of the corresponding helicoidal surfaces 116b of the second clutch 116. Since the position of the first clutch 113 is fixed, the second clutch 116 will be jacked up and move upwards, meanwhile the transmission shaft 115 is driven to move upwards and the tea basket 202 is driven to move upwards by the transmission shaft 115. The tea basket 202 is lifted to a second position separated from the drain valve 213. The drain valve 213 is opened so that the water configured to wash tea leaves will pass through the drain valve 213 and enter the waste water tank assembly 300.

When the motor 111 rotates in the second direction for a preset period, the water configured to wash tea leaves has been completely discharged. The motor 111 rotates in the first direction under the control of the controller, and the above processes will be repeated to make tea. After the water in the tea-making assembly 200 exceeds the top end of the siphon inlet pipe 121 of the siphon 119, it will enter the siphon inlet pipe 121 and pass through the siphon outlet pipe 120, and finally flow into the containers such as cups.

The above embodiment describes the situation that a plurality of helicoidal surfaces 116b are defined on the outer peripheral surface of the second clutch 116, however, the present application is not limited here. In another embodiment, a plurality of helicoidal surfaces can be defined on the first clutch, and the columns may be arranged on the second clutch. When the motor rotates in the first direction, the first clutch cooperates with the second clutch at the lowest point of the helicoidal surface. When the motor rotates in the second direction, the first clutch cooperates with the second clutch at the highest point of the helicoidal surface.

Comparing with the prior art, the full-automatic tea-making machine of the present application can automatically wash tea and make tea, and it is very convenient to use.

While the embodiments of the present application are described with reference to the accompanying drawings above, the present application is not limited to the above-mentioned specific implementations. In the inspiration of the present application, those ordinary skills in the art can also make many modifications, equivalent replacements or improvements without breaking away from the subject of the present application and the protection scope of the claims. All those belong to the protection of the present application.

What is claimed is:
1. A full-automatic tea-making machine, comprising a base assembly and a tea-making assembly arranged on the base assembly; wherein
    a water pump configured to pump water into the tea-making assembly and a motor are arranged on the base assembly;
    the tea-making assembly includes:
    a tea-making cavity with an open top part, a closed bottom part and a closed peripheral wall;
    a tea basket driven by the motor; and a drain valve arranged at the bottom of the tea-making cavity and communicated with the tea-making cavity; wherein the full-automatic tea-making machine further comprises a first clutch and a second clutch cooperated with each other to transmit a power between the motor and the tea basket, wherein the first clutch is driven by the motor, and the second clutch is configured to transmit the power to the tea basket; wherein when the motor has rotated in a first direction for a preset period, tea leaves in the tea basket has been washed thoroughly;

when the motor rotates in a second direction for a preset period, water configured to wash the tea leaves has been completely discharged; wherein a helicoidal surface is defined on the first clutch; when the motor rotates in the first direction, the first clutch is cooperated with the second clutch at a lowest point of the helicoidal surface; and when the motor rotates in the second direction, the first clutch is cooperated with the second clutch at a highest point of the helicoidal surface; or a helicoidal surface is defined on the second clutch; when the motor rotates in the first direction, the first clutch is cooperated with the second clutch at a highest point of the helicoidal surface; and when the motor rotates in the second direction, the first clutch is cooperated with the second clutch at a lowest point of the helicoidal surface.

2. The full-automatic tea-making machine according to claim 1, wherein the full-automatic tea-making machine further includes a waste water tank assembly arranged below the drain valve.

3. The full-automatic tea-making machine according to claim 1, wherein the tea basket includes two positions: a first position in which the tea basket rotates in a first direction to press onto the drain valve and further close the drain valve, and a second position in which the tea basket rotates in a second direction to separate from the drain valve.

4. The full-automatic tea-making machine according to claim 1, wherein the tea-making assembly further includes a siphon arranged on the base assembly; the siphon includes a siphon inlet pipe communicating with an internal part of the tea-making cavity, and a siphon outlet pipe; and an upper end of the siphon inlet pipe is connected to an upper end of the siphon outlet pipe.

5. The full-automatic tea-making machine according to claim 1, wherein a recessed receiving part of the tea-making assembly is defined on a top of the base assembly, and the tea-making assembly is received in the receiving part of the tea-making assembly.

6. The full-automatic tea-making machine according to claim 5, wherein a transmission shaft receiving cylinder is fixed in the receiving part of the tea-making assembly, a transmission shaft is arranged in the transmission shaft receiving cylinder, and an upper end of the transmission shaft extends through the transmission shaft receiving cylinder, and is further connected to the tea basket.

7. The full-automatic tea-making machine according to claim 1, wherein the full-automatic tea-making machine further includes a water purification chamber and a heating unit arranged on the base assembly;

the water pump is connected to the water purification chamber through an inlet pipe and is connected to the heating unit through a first delivery pipe; and the heating unit is connected to the tea-making assembly through a second delivery pipe.

* * * * *